April 11, 1950      O. CENTOFANTI      2,503,654
HIGH AND LOW LEVEL ALARM SYSTEM
Filed Feb. 25, 1948
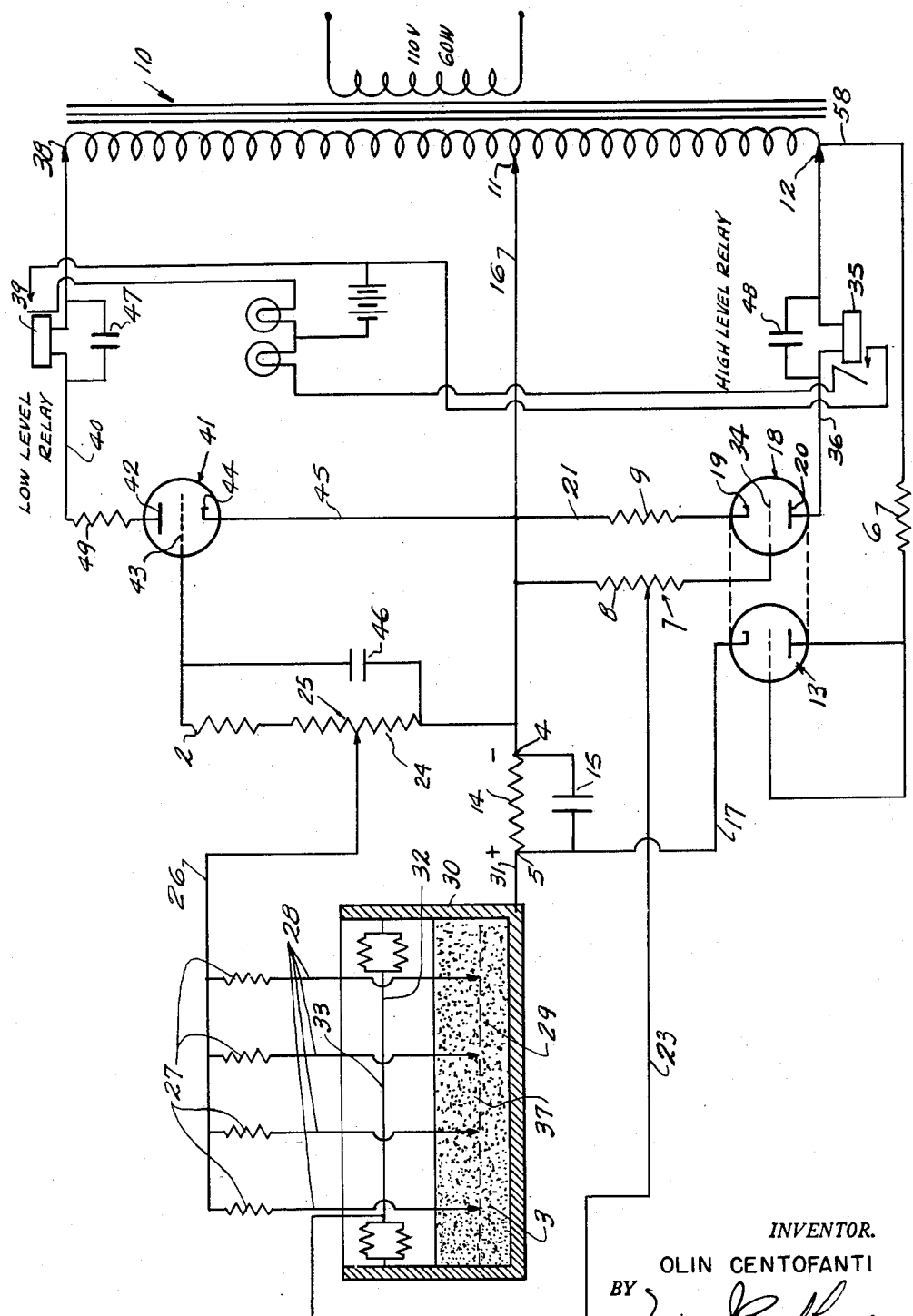
*INVENTOR.*
OLIN CENTOFANTI
BY
*AGENT OR ATTORNEY*

Patented Apr. 11, 1950

2,503,654

UNITED STATES PATENT OFFICE 2,503,654

HIGH AND LOW LEVEL ALARM SYSTEM

Olin Centofanti, Paulsboro, N. J., assignor to Socony-Vacuum Oil Company, Incorporated, New York, N. Y., a corporation of New York Application February 25, 1948, Serial No. 10,632

3 Claims. (Cl. 177—311)

This invention is directed to warning indicators of the high and low level type. It is primarily concerned with indicating when the predetermined high and low level limits of a material in a container have been reached, the material being conducting to electricity.

In recent years, a large proportion of the gasoline consumed has been formed by cracking heavy petroleum distillates to light fractions, boiling in the gasoline range. This was originally accomplished by subjecting the heavy oil to high temperature and pressure, whereby a substantial portion of the heavy oil was converted to light products of gasoline volatility. In a recent development, a particle-form, solid material is used as a catalyst to enable the cracking to be performed at low pressure and reduced temperature.

The particle-form material, used as a catalyst, is generally cylindrical, granular, or spherical in shape. The average maximum dimension of the particle is approximately 2-4 mm.; and the particles are made from material, such as fuller's earth, natural or treated filtering clays, or other substances such as alumina, silica, or alumina and silica combined.

In one favored system, the catalyst particles, spherical in shape, are termed beads, and the process of manufacture is referred to as the bead process. In the manufacture of the catalyst beads, droplets of the catalyst sol are passed through a liquid, immiscible with the sol, wherein the droplets solidify to spherical balls. The beads are washed, treated and transferred, usually in a water stream, to a collecting sump, located near the bead driers. The beads are raised automatically from the wet sump, and deposited in the feed hopper adapted to supply the beads, in a damp condition, to the bead drier or heater at a predetermined, uniform rate. The beads are fed from the hopper onto conveyor belts which carry the wet beads through the heater oven, wherein they are thoroughly dried. After further treatment, the beads are ready for use as a catalyst medium in a continuous type cracking process of petroleum hydrocarbons, or for various other uses.

The operations of supplying catalyst beads to the feed hopper preceding the drier, and discharging the catalyst from the feed hopper to the continuously moving belts of the heater or drier, are continuous, and substantially automatic. They require some manual control, occasionally, to prevent overflow of the feed hopper, which would result in possible jamming of the heater belts and related mechanism and/or high catalyst attrition. Underfeed of the catalyst beads to the hopper is similarly undesirable in that it results in inefficient operation of the relatively expensive heater equipment and an unwanted increase in the throughput time required to prepare a fixed quantity of catalyst beads.

It is an object of this invention to provide an indicator capable of signaling the rise or fall of a substance in a container above or below a predetermined level, when the substance is conducting to electricity.

It is a further object of this invention to provide an indicator capable of signaling the rise of a material within a container to a predetermined high level limit or the fall of the material within the container to a predetermined low level limit, when the material is conducting to electricity.

Other objects and advantages will be made apparent in the description of this invention by reference to the attached drawing, a circuit diagram of the invention, a portion of which is shown in section.

Referring to Figure 1, the container 30, shown in section, may conveniently be a catalyst feed hopper used in the bead process, previously described, to feed wet catalyst beads to the conveyor. When wet, the catalyst beads are conducting to electricity. The walls of the hopper 30 are constructed of conducting material to permit an electric circuit to be completed through the wet beads and the hopper. The catalyst is continuously supplied to the hopper and withdrawn from the hopper at substantially equal rates of flow, through pipes not shown, such that the level of catalyst in the hopper remains approximately as indicated in the figure. Occasionally the level will rise above the predetermined high level limit 32 or will fall below the predetermined low level limit 37, resulting in the undesirable effects previously described.

In this invention an iron core transformer 10 may be used to raise the supply voltage, such as obtained from a standard 110 volt, 60 cycle current, to the voltage required to operate the electronic tubes used. One half of a 7N7 electronic tube, used as a rectifier tube 13, is located in a circuit connected to a portion of the secondary of the transformer 10, such that during that portion of the cycle when the center tap 11 has a negative potential, relative to the end tap 12, current flows through conductor 58, resistor 6, rectifier tube 13, conductor 17, resistor 14 and conductor 16. A condenser 15, disposed in parallel with resistor 14, is charged during that portion of the cycle. During the alternate portion of the cycle, current is prevented from flowing through this circuit by the rectifier tube 13. The condenser 15 is selected such that sufficient energy is stored during the charging portion of the cycle to prevent the voltage across the resistor 14 from dropping below a predetermined value during that portion of the cycle when current is prevented from flowing in the complete circuit by the rectifier tube 13.

A second circuit, containing a triode tube 18 in series with a D. C. relay 35, is connected to a portion of the secondary of transformer 10. If the potential of the grid 34 is sufficiently positive, current flows from the end tap 12 of transformer 10, through the D. C. relay 35, conductor 36, triode tube 18, resistor 9, conductor 21, conductor 16 to middle tap 11. When the polarity of the transformer reverses, during alternate half cycles, current is prevented from flowing through the circuit in the reverse direction by the triode tube 18, which can transmit current only when the plate 20 is of positive potential relative to the cathode 19.

When the level of the catalyst 29 in the hopper 30 rises to a predetermined high level limit 32, the catalyst 29 comes into contact with a contactor 33, completing a current path shunting resistor 14. Current can then flow from tap 5 of resistor 14 through conductor 31, hopper 30, catalyst 29, contactor 33, conductor 23, a portion 8 of the resistance element of potentiometer 7 to tap 4 of the resistor 14. The potential drop across the portion 8 of the resistance element of potentiometer 7, which is zero when this path is open circuited, assumes a value equal to the potential drop across resistor 14 when the circuit is closed. Since one end of potentiometer 7 is connected to the cathode 19 of the triode tube 18 through conductor 21 and resistor 9, and the other end of the potentiometer 7 is connected to the grid 34 of triode tube 18, this voltage drop is placed upon the grid as a positive bias. The bias is made sufficiently large, by selecting resistors of suitable value, to make the tube 18 conductive when the polarity of the secondary of transformer 10 is correct, as hereinabove described. The pulsing direct current caused to flow in the the second circuit energizes the D. C. relay 35. The condenser 15 prevents the grid bias of tube 18 from falling below the release value during the alternate half cycles when current is prevented from flowing in the second circuit. This permits the tube 18 to transmit current as soon as the plate potential of the tube is positive which tends to smooth out the ripple of the current passing through the relay 35. In addition, a condenser 48 is placed in parallel with the relay 35 to hold the relay in during that portion of the cycle of the transformer when current will not flow in the second circuit. The relay 35 is adapted to control a circuit, containing a warning device, indicating rise of catalyst above the predetermined high level limit 32.

A third circuit, similar to the second, is connected to a portion of the secondary of the transformer 10. This circuit includes a gas triode tube 41. This tube is of a well known type and has the characteristic that when the grid potential supplied to the grid has been increased in a positive direction to a predetermined value, the tube becomes conductive at which time current can flow from end tap 38 of the transformer 10, through D. C. relay 39, conductor 40, resistor 49, gas triode tube 41, conductor 45, conductor 16 to middle tap 11. The gas triode tube 41 prevents current from flowing in this circuit when the polarity of the secondary of transformer 10 reverses, during the alternate half cycles.

A plurality of conductors 28, normally with one end buried in the catalyst, are brought from the hopper 30. The submerged ends 3 are equally distributed throughout a horizontal plane within the hopper 30 and all are located at the predetermined low level limit. When the catalyst level is not below the predetermined low level limit, the conductors 28 are part of a series-parallel path which shunts resistor 14. Current can flow from tap 5 of resistor 14 through hopper 30, catalyst 29, any or all of conductors 28, resistors 27, conductor 26, a portion 24 of the resistance element of potentiometer 25 to tap 4 of resistor 14. Since one end of the potentiometer 25 is connected to the grid 43 of gas triode tube 41 and the other end of the potentiometer 25 is connected to the cathode 44 of gas triode tube 41, the voltage drop across a portion 24 of the resistance element of the resistor 25 is applied to the tube as a positive grid bias. The potentiometer 25 can be adjusted such that the grid bias applied to the tube 41, when the catalyst level is above the predetermined low level limit 37, is just sufficient to cause the tube 41 to fire. The pulsing direct current, caused to flow in the third circuit, as previously described, energizes the D. C. relay 39. Because the voltage drop across the resistor 14 is pulsating in magnitude, the voltage drop across the portion 24 of the resistance element of the potentiometer 25 would be similarly pulsating. A condenser 46 is placed in parallel with the potentiometer 25 and the resistor 2 to minimize this effect, providing a grid bias for tube 41 of more uniform magnitude. This permits finer control of the gas triode tube 41 by the grid 43. A condenser 47 is placed in parallel with the relay 39, to hold it in during that portion of the cycle when the polarity applied to the plate 42 of the gas triode tube 41 is incorrect for the transmission of current. The relay 39 is adapted to control a circuit, containing a warning device, such that when the relay is engaged the warning device will not signal.

Upon fall of catalyst level below the predetermined low level limit 37, one or more of the contactors 3 are exposed to the air. This breaks the electric circuit through that conductor, thereby decreasing the flow of current through the portion 24 of the resistance element of the potentiometer 25. This, in turn, decreases the voltage drop across the portion 24 of the resistance element of the potentiometer 25, which is the grid bias of tube 41. The values of resistance are selected such that exposure of at least one of the contactors 3 to the air causes the grid bias of tube 41 to fall below the firing voltage and the third circuit is opened. The relay 39 is thereby de-energized, and the separate circuit, adapted to the relay 39 is controlled, causing the warning device to signal the fall of catalyst below the predetermined level 37.

For convenience, tubes 13 and 18 can each be one-half of a twin triode tube, such as a 7N7 tube. Tube 41 can be any tube having the desired characteristics, such as a GL–502A tube. The resistors 49, 9 and 6 are located in their various tube circuits to prevent the currents passing through the tubes from rising above safe transmission values.

Although this invention has been described with particular reference to a hopper containing wet catalyst beads, it is obvious that it can be applied to any container in which it is desired to indicate the level of a substance contained therein, providing the substance is conducting to electricity. It is further obvious that the high and low level relays can be made to operate any desired safety or regulating controls other than or in addition to the warning devices.

I claim:

1. In a system in which electrically conductive comminuted solid material is continuously supplied to and withdrawn from a hopper constructed of electrically conductive material, which comminuted solid is prone to bridging, pot-holing and like irregular flow giving rise to irregularities of surface of the said material and upsetting operation of any device fed from said hopper, a warning system capable of signalling high level of material, low level of material and irregularly surfaced combinations thereof comprising: a conductor which extends the entire horizontal width of the hopper, insulated from said hopper and so disposed as to be contacted by said solid when it reaches at any point the predetermined high level defined by said conductor, a series of contact points insulated from said conductor and from said hopper dependent into said solid to a predetermined low level and so distributed as to detect low level at a plurality of points distributed in said hopper, said contact points being mounted so that they are in a substantially horizontal line and are all connected in parallel for controlling a low level alarm system, a high level alarm system comprising a transformer, a conventional vacuum triode and a circuit comprising in series at least a portion of the secondary of said transformer, a resistance, the plate circuit of said tube and a warning-actuating relay, a potentiometer in the grid circuit of said triode, a level determining circuit comprising in series the hopper wall, the solid in said hopper and the high level contactor, a portion of the resistance of said potentiometer, and a source of unidirectional potential to produce a grid bias potential on said triode when the high level circuit is closed to render said triode conductive, a low level alarm system comprising in a circuit said previously mentioned source of unidirectional potential, the hopper, the solid in said hopper and the low level contact points, and means responsive to changes in the current flowing in said circuit for indicating the occurrence of said changes.

2. In a system in which electrically conductive comminuted solid material is continuously supplied to and withdrawn from a hopper constructed of electrically conductive material, which comminuted solid is prone to bridging, pot-holing and like irregular flow giving rise to irregularities of surface of the said material and upsetting operation of any device fed from said hopper, a warning system capable of signalling high level of material, low level of material and irregularly surfaced combinations thereof comprising: a conductor which extends the entire horizontal width of the hopper, insulated from said hopper and so disposed as to be contacted by said solid when it reaches at any point the predetermined high level defined by said conductor, a series of contact points insulated from said conductor and from said hopper dependent into said solid to a predetermined low level and so distributed as to detect low level at a plurality of points distributed in said hopper, said contact points being mounted so that they are in a substantially horizontal line and are all connected in parallel for controlling a low level alarm system, a high level alarm system comprising a transformer a conventional vacuum triode and the hopper wall, the solid in said hopper and the high level contactor, a portion of the resistance of said potentiometer, a resistance and an energy storing device shunting same, means for applying a constant potential to the high level circuit to produce a grid bias potential on said triode when the high level circuit is closed to render said triode conductive, a low level alarm system comprising in a circuit the previously mentioned constant potential applying means, the energy storage device previously named together with the resistance associated therewith, the hopper, the solid in said hopper and the low level contact points, and means responsive to changes in the current flowing in said circuit for indicating the occurrence of said changes.

3. In a system in which electrically conductive comminuted solid material is continuously supplied to and withdrawn from a hopper constructed of electrically conductive material, which comminuted solid is prone to bridging, pot-holing and like irregular flow giving rise to irregularities of surface of the said material and upsetting operation of any device fed from said hopper, a warning system capable of signalling high level of material, low level of material and irregularly surfaced combinations thereof comprising: a conductor which extends the entire horizontal width of the hopper, insulated from said hopper and so disposed as to be contacted by said solid when it reaches at any point the predetermined high level defined by said conductor, a series of contact points insulated from said conductor and from said hopper dependent into said solid to a predetermined low level and so distributed as to detect low level at a plurality of points distributed in said hopper, said contact points being mounted so that they are in a substantially horizontal line and are all connected in parallel for controlling a low level alarm system, a high level alarm system comprising a transformer a conventional vacuum triode and the hopper wall, the solid in said hopper and the high level contactor, a portion of the resistance of said potentiometer, a resistance and an energy storing device shunting same, means for applying a constant potential to the high level circuit to produce a grid bias potential on said triode when the high level circuit is closed to render said triode conductive, a low level alarm system comprising in a circuit the previously mentioned constant potential applying means, the energy storage device previously named together with the resistance associated therewith, the hopper, the solid in said hopper and the low level contact points, and means responsive to changes in the current flowing in said circuit for indicating the occurrence of said changes, comprising means for developing a potential proportionate to said current change, a gas triode having a plate circuit including a power supply and indicating means, and means for applying said proportionate potential to said triode to control the conductivity thereof.

OLIN CENTOFANTI.

REFERENCES CITED

The following references are of record in the file of this patent:

UNITED STATES PATENTS

| Number | Name | Date |
| --- | --- | --- |
| 317,289 | Boyle | May 5, 1885 |
| 1,520,004 | Bloch | Dec. 23, 1924 |
| 2,202,197 | Ewertz | May 28, 1940 |
| 2,385,161 | Pinkerton | Sept. 18, 1945 |